Patented Aug. 11, 1953

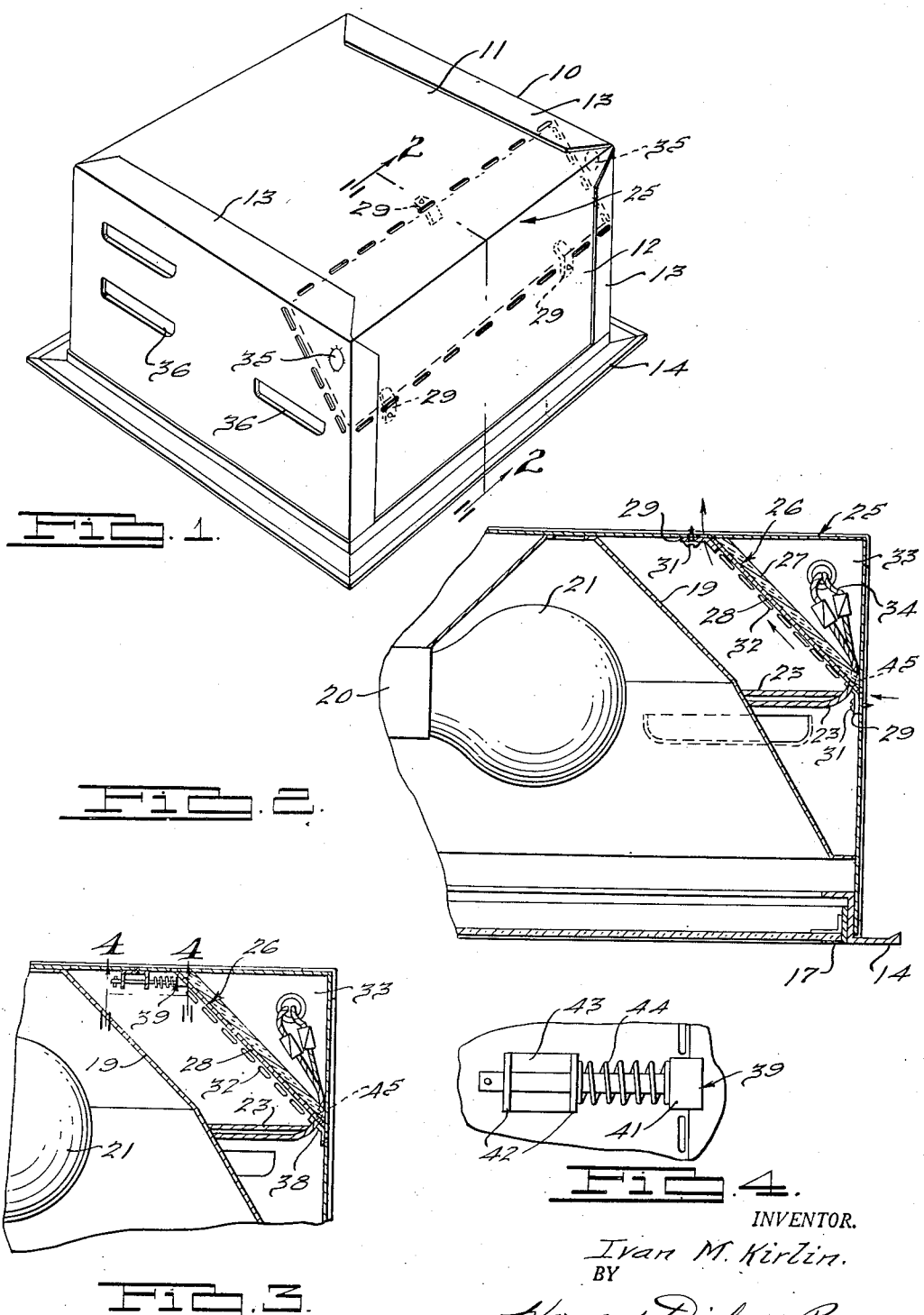

2,648,764

UNITED STATES PATENT OFFICE 2,648,764

RECESSED LIGHT FIXTURE HAVING HEAT INSULATED CORNER FOR TERMINALS

Ivan M. Kirlin, Detroit, Mich., assignor to The Kirlin Company, a partnership

Application February 3, 1950, Serial No. 142,219

1 Claim. (Cl. 240—78)

This invention relates to recessed lighting fixtures, and particularly to a recessed lighting fixture having a junction box incorporated therein.

Difficulty has been experienced in the past in connecting rubber-covered conductors to the source of light within the box due to the heat developed within the box. It has been the practice to employ heat-resisting covering on the wire which extends from the box some distance to an adjacent junction box to which the rubber-covered wires are led.

In the copending application of Ivan M. Kirlin, Serial No. 117,139, filed September 22, 1949, and assigned to the assignee of the present invention, a junction box of the standard type is illustrated as being applied to one side face of the box. While this has proved satisfactory, it is believed that the present construction is more desirable especially when the recessed fixture is to be applied to a plaster ceiling since difficulty would be experienced in having the recess box with the junction box attached inserted through the opening without enlarging the hole in the plaster to an extent that it would not be covered by the trim flange of the box.

The present invention pertains to the isolation of one corner edge at the top of the box by an insulating panel which is disposed behind apertures through the top and side panels of the box to permit the escape of heated air so as to maintain the temperature within the isolated corner below the maximum which would satisfy the Underwriters' requirement. The partition is preferably made of a sheet of metal having an insulating coating thereon which reduces the transfer of heat from the box interior to the interior of the isolated area. The partition is retained in position by easily removable means, such as screws or a retractable latch. The wires from the light source having the heat resisting covering are connected to the rubber-covered lead wires within the isolated area behind the partition, protected from a rise of temperature beyond a safe amount by the partition and the ventilating apertures. After the wires have been connected together, it is only necessary to place the partition in position across the corner to isolate the area in a manner pointed out above.

Accordingly, the main objects of the invention are: to isolate an area of a recessed fixture in which the connection of the wires from the light source to the lead wires may be made; to provide an isolated area within a recessed fixture which functions as a junction box by an insulating partition which is removably supported therein beyond ventilating apertures which substantially reduces the conduction of heat through the walls into the isolated area; to provide means for releasably supporting a partition within a recess box which may be readily removed and installed; and, in general, to provide an isolated area within a recessed fixture box, the temperature of which is retained lower than that of the box by means which is simple in construction and economical of manufacture.

Other objects and features of novelty of the invention will be specifically pointed out or will become apparent when referring, for a better understanding of the invention, to the following description taken in conjunction with the accompanying drawing, wherein:

Figure 1 is a perspective view of a recessed lighting fixture embodying features of the present invention;

Fig. 2 is a sectional view of the structure illustrated in Fig. 1, taken on the line 2—2 thereof;

Fig. 3 is a broken view of structure, similar to that illustrated in Fig. 2, showing a modified form thereof; and Fig. 4 is an enlarged view of the structure illustrated in Fig. 3, as viewed from line 4—4 thereof.

The recessed lighting fixture, as illustrated in Figs. 1 and 2, embodies a recess box 10 which may be square, rectangular or of other shape, having a top wall 11 and four side walls 12. The top wall and side walls are secured together through the welding of the overlapped flanges 13 thereto. A frame 14, which is preferably a casting, is secured to the open edge 15 of the box by suitable screws or the like, as illustrated in the above mentioned application. A lens-supporting frame 17 is hinged at one end of the frame 14 within a recess therein and is secured to the frame by a thumb screw, as illustrated and described in the copending application of Ivan M. Kirlin, Serial No. 99,923, filed June 18, 1949, and assigned to the assignee of the present invention.

A reflector 19 is mounted within the box by suitable means, and a socket is also mounted therein in position to support a light bulb 21 beneath the reflector. A pair of conductors 23, having heat-resisting insulation thereon, is connected to the socket and extends between the side walls 12 and reflector 19. The corner 25 of the box is isolated from the remainder of the interior of the box by a partition 26 which may be made entirely of heat-resisting insulating material or which may be a sheet 27 of such material and applied to a sheet of metal 28. Tabs 29 are provided on the partition 26 for the application of metal screws 31 therethrough for securing the partition across the corner 25, as illustrated in the figures.

A plurality of spaced elongated slots 32 are formed in the side walls 12 and top wall 11 at the side of the partition toward the interior of the box to substantially reduce the conduction flow of heat through the wall portions defining the isolated area. The slots also form ventilating openings to permit the heat generated within the box to pass therefrom without impinging upon and remaining static against the partition 26. By this means, the area 33 within the corner 25 remains cool as compared to the temperature in the other portion of the box. The area was found to be at sufficiently low temperature to permit the rubber-covered lead wires to be disposed therein without damage to the insulation.

By retaining the isolated area at a temperature which will pass the Underwriters' requirement for the presence of rubber-insulated lead wires, the corner 25 may thereby be used as a junction box for connecting the conductors 23 to the rubber-covered conductors 34. Knockout apertures 35 are provided in each of the opposite walls 12 of the corner 25 so that one or the other may be employed for receiving the conduit through which the lead conductors 34 are brought into the isolated corner. Louvers 36 of conventional form are provided in certain or all of the side walls 12.

In Figs. 3 and 4, a further form of the invention is illustrated, that wherein the lower edge of the partition 26 rests upon a flange 38 of a plurality of fingers or a strip which is applied to the side wall 12 of the box. The upper end of the partition is secured in place against the top wall 11 by a spring-pressed detent 39, illustrated more specifically in Fig. 4. The detent embodies a plunger 41 secured in flanges 42 of a bracket 43 and forced outwardly toward the partition by a spring 44. Upon the retraction of the detent, the partition may be hinged downwardly about the flange 38 so that it may be removed from within the box. After the connection between the conduits 23 and 34 is made in the conventional manner, the partition may then be applied to the corner by placing the lower edge over the flange 38, with the conductors 23 extending through a slot 45 in the partition and hinging the partition upwardly past the detent 39 when retracted, whereupon the plunger will be forced forwardly by the spring 44 upon its release to force the partition against the top wall 11. When employing this construction, the junction box on the outside of the wall 12 of the box illustrated in the above mentioned copending application is eliminated, substantially reducing the cost of the recessed lighting fixture and permitting the fixture to be employed for installation on plaster ceilings without any difficulty of inserting the box through the opening therein.

What is claimed is:

In a recessed lighting fixture, a box of sheet metal having four side walls and an end wall with an open face opposite to said end wall, a light receptacle supported within said box on one of said walls, a reflector within said box, a portion of three side walls and the end wall of the box being separated from the remaining portion of the box by elongated slots closely related to each other to substantially reduce the conduction of heat through the walls of the remaining box portion to the walls of the separated portion, and a removable heat insulating partition within the box for dividing the remaining box portion from the separated portion with the elongated slots positioned in the remaining box portion for substantially reducing the passage of heat from the remaining box portion into the separated box portion.

IVAN M. KIRLIN.

References Cited in the file of this patent

UNITED STATES PATENTS

| Number | Name | Date |
|---|---|---|
| 1,575,690 | Kausal | Mar. 9, 1926 |
| 1,748,352 | Knapp | Feb. 25, 1930 |
| 2,242,525 | Kirlin | May 20, 1941 |
| 2,313,131 | Elias | Mar. 9, 1943 |

OTHER REFERENCES

Catalogue, "Recessed Lighting Equipment," by Curtis Lighting, Chicago, Ill., pages XR–112, XR–113. Copyrighted 1938. (A copy may be found in Division 65 of this Office.)